United States Patent [19]

Ramakrishnan

[11] 4,341,090
[45] Jul. 27, 1982

[54] VARIABLE ORIFICE METERING

[75] Inventor: Rengaswamy Ramakrishnan, Fort Worth, Tex.

[73] Assignee: Lennox Industries, Inc., Dallas, Tex.

[21] Appl. No.: 228,068

[22] Filed: Jan. 26, 1981

[51] Int. Cl.³ .............................................. F25B 13/00
[52] U.S. Cl. .................... 62/324.1; 62/324.7; 137/493.9
[58] Field of Search ................. 62/324.1, 324.6, 324.7, 62/511, 527, 528; 137/513.3, 493.4, 493.3, 493.5, 493.9; 251/121; 138/45

[56] References Cited

U.S. PATENT DOCUMENTS 3,493,270  2/1970  Doerfler ..................... 137/493.9 X
3,766,898 10/1973  McMullen ........................ 137/480
3,992,898 11/1976  Duell et al. ..................... 62/324.6
4,263,787  4/1981  Domingorena .................... 62/324.6

Primary Examiner—Lloyd L. King
Attorney, Agent, or Firm—Allegretti, Newitt, Witcoff & McAndrews

[57] ABSTRACT

A heat pump system is provided which uses a combination variable orifice valve means and check valve means in place of a separate thermal expansion valve and a separate check valve in parallel fluid flow relationship therewith to control flow between the indoor coil and the outdoor coil. The combination variable orifice metering means and check valve means, which provides controlled fluid flow in one mode of operation and substantially free fluid flow in the other mode of operation, comprises a valve housing having a passage therethrough, a tubular valve body movable in the passage, between a position where fluid can pass freely between the valve body and the valve housing and a position where the fluid passes through the valve body, an orifice in the valve body, and a spring-biased valve plug movable relative to the orifice and cooperating with the orifice to vary the effective area of the orifice to control the flow of fluid through the orifice in the one mode of operation, the fluid passing freely between the valve body and the valve housing in the other mode of operation. The combination variable orifice valve means and check valve means is compact, less expensive, easier to connect and use in a heat pump system, and more reliable than the fixed orifice size devices, such as a capillary tube, and check valve heretofore used in some heat pump systems. It is also more compact and less costly than the separate thermal expansion valve and check valve previously used in some heat pump systems.

7 Claims, 12 Drawing Figures

4,341,090

VARIABLE ORIFICE METERING

BACKGROUND OF THE INVENTION

This invention pertains to a heat pump system and more particularly, to an improved heat pump system incorporating combination variable orifice metering and check valves.

A basic air conditioning system comprises a compressor, an outdoor coil, expansion means and an indoor coil. High pressure vaporous refrigerant from the compressor is condensed in the condenser, which is air cooled or water cooled, as is well-known in the art. The liquid refrigerant is metered through the expansion means, which is conventionally a thermal expansion valve or a capillary tube. As the refrigerant expands and returns to the vaporous state in the indoor coil, it cools the indoor coil and air passed over the indoor coil from the area to be treated or conditioned, for example, a room in a house, is cooled.

Such basic air conditioning system can be adapted to a heat pump system to selectively heat or cool the area to be treated by adding a four-way reversing valve in the refrigerant circuit between the compressor and the indoor and outdoor coil. The heat pump system will function as a basic air conditioning system to cool the area to be treated when refrigerant is ported first to the outdoor coil. If refrigerant is ported first to the indoor coil, the air passing over the indoor coil will be heated and heated air will be supplied to the area to be treated.

A typical heat pump system is shown in Hale U.S. Pat. No. 3,170,304. Such system includes expansion means comprised of a thermal expansion valve for each mode of operation and a separate check valve disposed in parallel circuit flow relationship with each thermal expansion valve. For cooling, the check valve adjacent the outdoor coil is open and the check valve adjacent the indoor coil is closed. The thermal expansion valve adjacent the indoor coil will control the flow of refrigerant to the indoor coil. For heating, the check valve adajcent the outdoor coil is closed and the check valve adjacent the indoor coil is open. The thermal expansion valve adjacent the outdoor coil will control the flow of refrigerant to the outdoor coil. The respective thermal expansion valves can be designed for the same size flow rate or different size flow rates to accommodate specific system applications.

The present invention provides a combination variable orifice metering and check valve that is intended to be substituted for a separate thermal expansion valve and separate check valve. The novel combination valve provides a variable control of refrigerant flow in a more simple, economical and less expensive fashion than does a conventional check valve in parallel flow relationship with the thermal expansion valve.

The prior art does disclose some valves having superficial similarity to the combination variable orifice metering and check valve of the present invention, but they are intended for purposes other than heat pump systems, hence they are constructed differently and function differently from the novel combination valve of the present invention. For example, Sands U.S. Pat. No. 2,623,725 shows a safety valve for controlling flow in one direction and shutting off flow in the opposite direction. Francher U.S. Pat. No. 3,067,770 pertains to a valve of the charge and spill type. Sands U.S. Pat. No. 3,122,162 pertains to a flow control device that represents an improvement over the subject matter of the Sand U.S. Pat. No. 2,623,725. Hansen U.S. Pat. No. 3,580,274 shows a combined pressurizing and relief valve in the control head of a fire extinguisher. None of these prior patents suggests the novel combination variable orifice metering and check valve means for a heat pump system disclosed herein.

An object of the present invention is to provide an improved heat pump system incorporating combination variable orifice metering and check valve means wherein the disadvantages and deficiencies in prior heat pump systems are overcome.

Another object of this invention is to provide a novel combination variable orifice metering and check valve for a heat pump system. Other objects and advantages of the present invention will be made more apparent in the detailed description of the invention which follows.

BRIEF DESCRIPTION OF THE DRAWINGS

There is shown in the attached drawings a presently preferred embodiment of the present invention wherein like numerals refer to like elements in the various figures and wherein.

DETAILED DESCRIPTION OF THE PRESENT INVENTION

Figure 1:
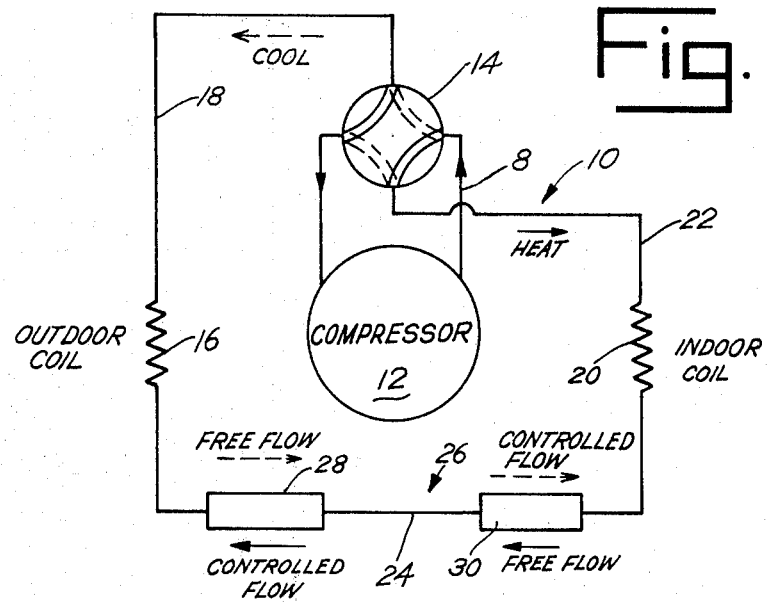
FIG. 1 is a schematic illustration of a heat pump system embodying the combination variable orifice metering valve and check valve of the present invention.

With reference to FIG. 1, there is shown a schematic of a heat pump system embodying the present invention. The heat pump system 10 comprises a compressor 12, a four-way reversing valve 14 for selectively porting high pressure refrigerant vapor from the compressor 12 to either an outdoor coil 16 via line 18 or to an indoor coil 20 via line 22. The indoor and outdoor coils 16, 20 are interconnected by line 24 within which is disposed regulating means for regulating the refrigerant flow during the heating and cooling modes of operation. In the present invention as illustrated, the regulating means 26 comprise a pair of combination variable orifice metering valve and check valve means 28 and 30. If desired, the two valve means 28 and 30 could be incorporated into a unitary housing, as would be desirable in single package systems.

The operation of the heat pump system 10 will be described and then the detail of the novel combination variable orifice metering valve and check valve will be described. During the heating mode of operation, the room thermostat or like control (not shown) will be set for heating and the reversing valve 14 will be positioned as shown in the solid lines in FIG. 1. High pressure refrigerant from compressor 12 will pass through discharge line 8 to the four-way reversing valve 14 and then into line 22 to the indoor coil 20, which acts as a condenser to condense the high pressure vaporous refrigerant from the compressor 12. Air passing over the indoor coil 20 will be heated and discharged into an environment, for example, a room in a building, for heating same. The refrigerant from the indoor coil 20 will flow through valve means 30, which is in a free flow condition, and then through valve means 28, wherein the refrigerant flow is metered or controlled. The expanding refrigerant passes to the outdoor coil 16, which acts as an evaporator. Refrigerant is returned to the compressor 12 via line 18, reversing valve 14 and suction line 9. Line 18 acts as an extension of the suction line 9 in the heating mode of operation.

During the cooling mode of operation, the room thermostat or like control (not shown) will be set for cooling and the reversing valve 14 will be moved to the position shown by the dotted lines in FIG. 1. High pressure refrigerant from compressor 12 will pass through discharge line 8, the reversing valve 14, and line 18 to the outdoor coil 16, which acts as a condenser to condense the high pressure vaporous refrigerant from the compressor. The condensed refrigerant will flow from the outdoor coil 16, through valve means 28, which is in a free flow condition and then through valve means 30, wherein the refrigerant flow is metered or controlled. The expanding refrigerant passes to the indoor coil 20, which acts as an evaporator. Air passing over the evaporator to the environment to be conditioned is cooled so as to cool such environment. Refrigerant is returned to the compressor 12 from the indoor coil 20 via line 22, reversing valve 14 and suction line 9.

Figure 2:
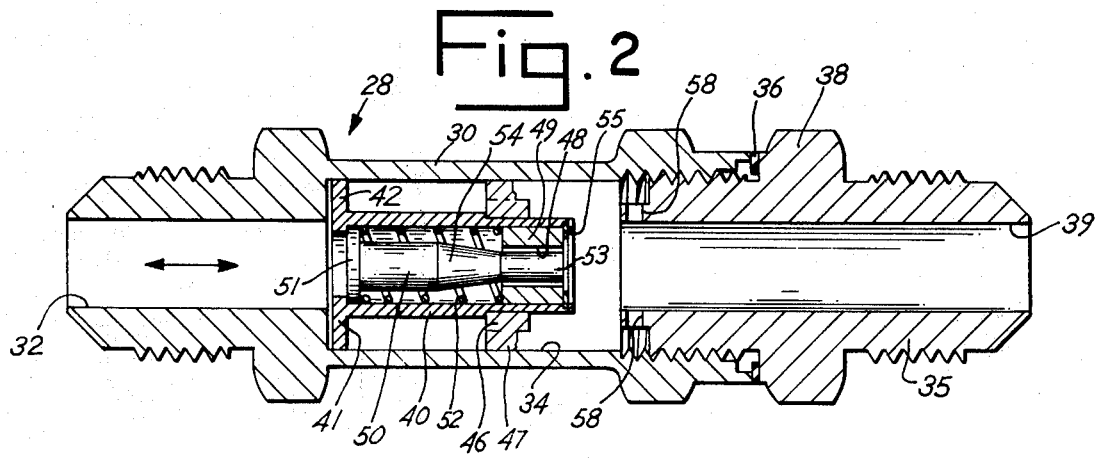
FIG. 2 is a cross-sectional view of the combination variable orifice metering valve and check valve, illustrating the components in the controlled flow position during the cooling mode.
Figure 3:
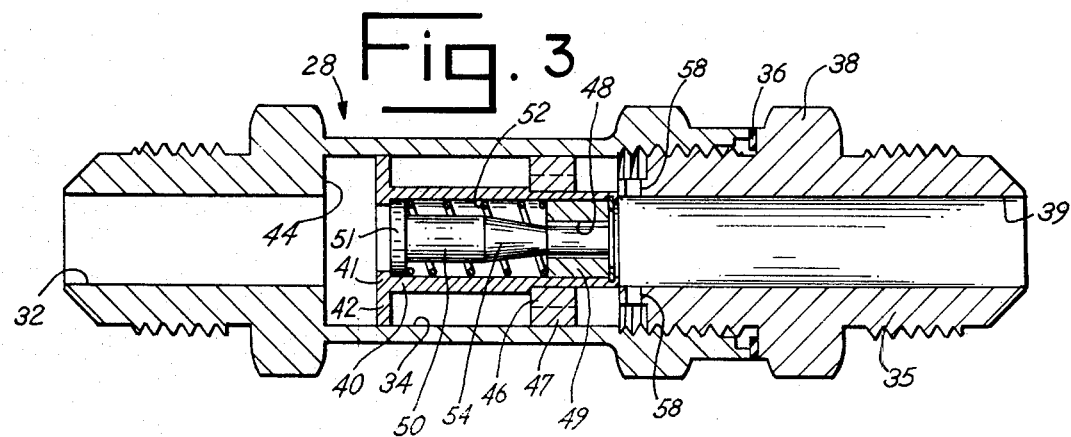
FIG. 3 is a cross-sectional view of the combination variable orifice metering valve and check valve illustrating the components in the free flow position during the cooling mode.

In FIGS. 2 and 3, there are shown longitudinal cross-sectional views of a combination variable orifice metering valve and check valve 28. The combination valve 28 is shown and it is understood that the combination valve 30 is of the same construction, though the effective size of the orifice in the valve may be varied for a particular application to provide a different operational characteristic if needed, as would be apparent to an engineer skilled in the art. The principle of operation is the same and the construction is otherwise the same for the combination valves 28 and 30.

The combination valve 28 is shown in a flow controlling position in FIG. 2 and in a free flow position in FIG. 3. The combination valve 28 includes a valve housing 30 having a passage 32 therein with an enlarged portion defining a chamber 34. Housing part 35 is coupled to the housing 30 and closes the chamber 34. Housing part 35 is coupled to the housing 30 by suitable means, for example, complementary male and female threads on the respective parts, as shown. A seal 36 is positioned between the abutting surfaces of the end of housing 30 and a side of flange 38 on housing part 35. The seal may be a resilient plastic or soft metal, such as copper.

Positioned within chamber 34 is a valve body 40 which is movable between a controlled flow position shown in FIG. 2 and a free flow position shown in FIG. 3. At one end, guide projections 42 are formed on the valve body 40. The guide projections 42 are adapted to engage the inner wall of valve housing 30, which defines the chamber 34 and the projections 42 each have limited circumferential extent to provide for substantially unrestricted flow between the valve body 40 and valve housing 30 when the valve body is positioned as shown in FIG. 3. When the valve body 40 is in the position shown in FIG. 2, the left face of the valve body 40 will abut the transverse wall 44 in the valve housing 30 and fluid must flow through the valve body 40. The valve body 40 is connected to a guide ring 46 which is suitably secured to the valve body 40 and movable therewith within chamber 34. The guide ring 46 has upper and lower projections 47 of limited circumferential extent for guiding movement of the valve body 40 in chamber 34, yet not materially interfering with fluid flow between the exterior of valve body 40 and the interior of the valve housing 30.

Figure 10:
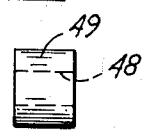
FIG. 10 is a front elevation view of the orifice plug.
Figure 11:
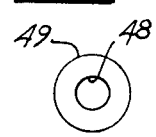
FIG. 11 is a side view of the orifice plug.

Provided within the valve body 40 is an orifice plug 49 having an orifice 48 (FIGS. 10 and 11). The effective flow area is determined by the annular spacing between the movable orifice plug 49 and the valve guide plug 50. This valve plug 50 is comprised of a contoured surface 54, a protrusion 53, and a shoulder head 51. The position of orifice plug 49 relative to said surface 54 and said protrusion 53 is a function of the pressure difference across the said orifice plug 49 and the characteristics of spring 52. The effective flow area is defined between the orifice opening 48 and the surfaces 53, 54 of the valve plug 50. See FIGS. 2 and 3. Spring 52 seats between said shoulder head 51 and said movable orifice plug 49, which in turn is contained in valve body 40 by holding means 55 in the form of a retaining ring.

Figure 7:
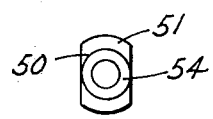
FIG. 7 is an end view of the valve plug.

As best seen in FIG. 7, the sides of the head 51 are cut away so that fluid can flow through the valve body 40 and pass into passage 32. Referring to FIG. 2, with valve body in position shown to control the rate of flow of refrigerant to the indoor coil 20 in the cooling mode, high pressure liquid from the condenser or outdoor coil 16 enters the valve body assembly through orifice opening 48. As the refrigerant flows through the restricted opening, its pressure reduces and approaches that of the evaporator 20 when it flows past the orifice plug 49. The pressure difference across said orifice plug 49 determines its position relative to the contoured surface 54 and protrusion 53, thereby determining the effective flow area for regulating the flow. A decrease in pumping rate created, for instance, by an increase in outdoor temperature, will be associated with an increase in pressure difference across orifice plug 49. This in turn will cause orifice plug 49 to move in the direction of valve head 51, causing the orifice opening between plug 49 and surface 54 to reduce, thus reducing the flow rate to match the evaporator load. Similarly, an increase in pumping rate caused, for instance, by a decrease in outdoor temperature, will be associated with a decrease in the pressure difference across orifice plug 49. This action will cause the orifice opening to present an increased effective flow area, thus increasing the flow rate to match the evaporator load. With proper selection of spring 52, contoured surface 54, orifice opening 48 and surface area presented by orifice plug 49, the flow of refrigerant can be precisely regulated at all times to the evaporator.

In FIG. 3, there is shown the free flow position of the components of the combination valve 28. The orifice plug 49 is contained in the valve body 40 by a retaining ring 53. The end of valve body 40 abuts the left end of housing part 38. Fluid from passage 32 will flow about the projections 42 on the valve body 40 and between the valve body 40 and the valve housing 30 and through transverse holes 58 in the housing part 38 into passage 39. Such flow of refrigerant is substantially unrestricted as compared with flow in the opposite direction, as shown in FIG. 2.

Figure 12:
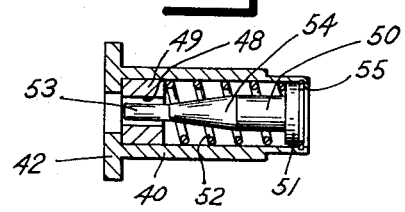
FIG. 12 is a cross-sectional view of the valve body illustrating the relationship of the orifice and the valve plug when the combination variable orifice metering and the check valve is in controlled flow operation during the heating mode.

When the system is operating in the heating mode, an increase in flow rate will be associated with an increase in pressure difference across the variable orifice metering and check valve meter and vice versa. This necessitates interchanging the positions of valve plug 50 and orifice plug 49 within valve body 40, in order to arrive at an increased orifice opening with increased flow rate and vice versa. See FIG. 12. The applied force to create a variation in flow area is derived from the pressure difference across the two ends of valve plug 50.

The effective orificial area is designed according to the mass flow of refrigerant necessary for a specific application or range of applications. The designer can select the contour of the surface 54 on the valve plug 50 and he can vary the diameter of the orifice 48 or spring contant of spring 52. The portion 53 of the valve plug 50 is adapted to be positioned within the orifice 48 and cooperate with the orifice 48 to provide an annular flow path of substantially constant cross-sectional area between the outer surface of portion 53 of the valve plug 50 and the wall defining the orifice 48. It may be possible for some applications to reduce the longitudinal extent of portion 53.

Figure 4:
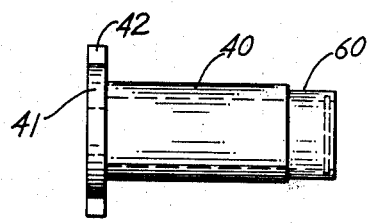
FIG. 4 is an elevation view of the valve body in the combination variable orifice metering valve and check valve.
Figure 5:
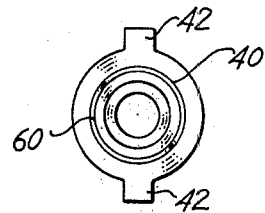
FIG. 5 is an end view of the valve body.

FIGS. 4 and 5 better show the construction of the valve body 40. The annular flange 41 at one end of the valve body 40 has projections 42 extending outwardly from the flange 41. The outer surfaces of the projections 42 abut the inner surface of chamber 34 to help guide the longitudinal movement of the valve body 40 in the chamber 34 of the valve housing 30. The end of the valve body 40 opposite from the flange 41 has a reduced diameter outer surface portion 60 which is adapted to receive thereon the guide 46. The guide 46 receives the surface portion 60 snugly so as to be movable therewith in use.

It can be seen the projections 42 have only limited width or circumferential extent so as to provide minimum interference to fluid flow thereabout when the valve body 40 is positioned as shown in FIG. 3. When the flange 41 on valve body 40 abuts the wall 44 of chamber 34, the fluid flow will be blocked between the valve body 40 and the valve housing 30 and fluid will pass through the valve body under control of the pressure differential on opposite sides of orifice plug 49.

Figure 6:
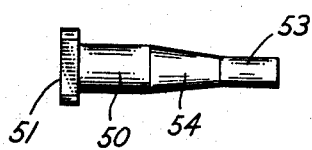
FIG. 6 is an elevation view of the valve plug.

Turning to FIGS. 6 and 7, there is shown the valve plug 50. The flange 51 is not a continuous annulus, rather it has upper and lower projections and the sides are cut away to provide for fluid flow about the head or flange 51.

Contoured surface 54 on the valve plug 50 may be frustra conical or the surface may be characterized for a particular application.

Figure 8:
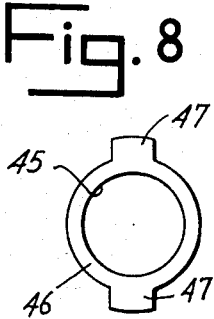
FIG. 8 is a front elevation of the valve body guide.
Figure 9:
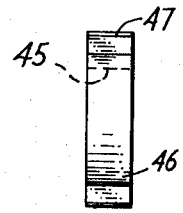
FIG. 9 is a side view of the valve body guide.

The guide 46 has an opening 45 adapted to snugly receive the surface 60 of the valve body 40 (FIGS. 8 and 9). Projections 47 extend outwardly from the guide 46 and are adapted to engage the surface of housing 30 that defines the chamber 34 to help guide the valve body 40 longitudinally in the chamber 34. Thickness of guide 46 is such as to support surface 60 at all times, regardless of the position of valve body 40.

The present invention provides a combination variable orifice metering and check valve for a heat pump system that is relatively inexpensive, reliable, and performs the same basic function as the expansion valve and check valve arrangements often used heretofore in a heat pump system.

While I have shown a presently preferred embodiment of the present invention, it will be apparent to those skilled in the art the invention may take such other forms as are embodied within the scope of the following claims.

What is claimed is:

1. For use in a heat pump having a compressor, an indoor coil, an outdoor coil, means for porting refrigerant selectively from the compressor to either the indoor coil to heat an environment or to the outdoor coil to cool an environment, and regulating means between the indoor coil and the outdoor coil for regulating the refrigerant flow during the heating and the cooling modes of operation, characterized by the regulating means between the indoor coil and the outdoor coil comprising combination variable orifice valve means and check valve means for providing controlled fluid flow to the indoor coil in one mode of operation and substantially free fluid flow to the indoor coil in the other mode of operation, said combination variable orifice valve means and check valve means comprising a valve housing having a passage therethrough, a tubular valve body movable within said passage, said valve body having an orifice therein, said valve body having projections at one end for guiding the valve body in the passage, but providing substantially unrestricted flow between the valve housing and the valve body in said other mode of operation, and spring-biased metering means including a plug movable relative to the orifice and cooperating with the orifice to vary the effective area of the orifice for controlling flow of fluid through the orifice for providing controlled flow in said one mode of operation, said variation of the effective area of the orifice being precisely controlled by the pressure difference acting across the plug.

2. Regulating means as in claim 1 wherein the valve housing comprises two tubular portions detachably connected to one another to define a chamber within which the valve body is movable, the valve body at one side abutting a shoulder of one tubular portion and at the other side abutting an end of the other tubular member.

3. Regulating means as in claim 1 including guide means in the valve housing for supporting and guiding a portion of valve body in the passage in the valve housing.

4. Regulating means as in claim 2 wherein the valve body is adapted to abut the end of the other tubular member having transverse openings therein, whereby the fluid can flow freely in said passage in the valve housing between the valve body and the valve housing and through the said transverse openings.

5. Regulating means as in claim 1 comprising two regulating means between the indoor coil and the outdoor coil, each comprising combination variable orifice valve means and check valve means.

6. Means for regulating flow of refrigerant to the indoor coil of a heat pump system comprising combination variable orifice valve means and check valve means for providing controlled fluid flow to the indoor coil in one mode of operation and substantially free fluid flow to the indoor coil in the other mode of operation, said combination variable orifice valve means and check valve means comprising a valve housing having a passage therethrough, a tubular valve body movable within said passage, said valve body having an orifice therein, said valve body having means thereon for guiding the valve body in the passage, but providing substantially unrestricted flow between the valve housing and the valve body in said other mode of operation, and spring-biased metering means including a plug movable relative to the orifice and cooperating with the orifice to vary the effective area of the orifice for controlling flow of fluid through the orifice for providing controlled flow in said one mode of operation, said variation of the effective area of the orifice being precisely controlled by the pressure difference acting across the plug.

7. Combination variable orifice valve means and check valve means as in claim 6 including a contoured surface on the valve plug cooperating with the orifice for controlling the effective flow area between the valve plug and the orifice by movement of the valve plug relative to the orifice.

* * * * *